Aug. 5, 1958 R. LABURTE 2,845,819
AUTOMATIC CONTROL DEVICE FOR A GEAR BOX
Filed May 15, 1956 4 Sheets-Sheet 1

Inventor:
Roland LABURTE
by J. Delattre-Seguy
Attorney

Aug. 5, 1958  R. LABURTE  2,845,819
AUTOMATIC CONTROL DEVICE FOR A GEAR BOX
Filed May 15, 1956  4 Sheets-Sheet 2

Inventor:
Roland LABURTE
by: J. Delater Seguy
Attorney

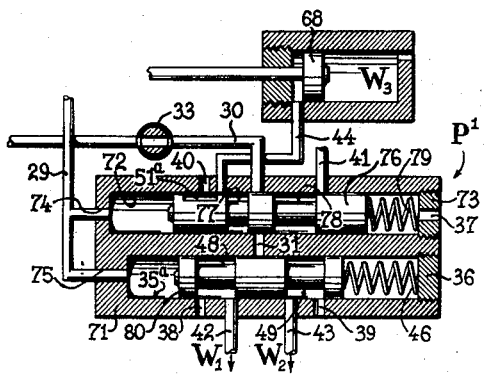

Aug. 5, 1958 R. LABURTE 2,845,819
AUTOMATIC CONTROL DEVICE FOR A GEAR BOX
Filed May 15, 1956 4 Sheets-Sheet 4

Inventor:
Roland LABURTE
by: J. Delattre-Seguy
Attorney.

United States Patent Office 2,845,819
Patented Aug. 5, 1958

2,845,819

AUTOMATIC CONTROL DEVICE FOR A GEAR BOX

Roland Laburte, Nancy, France, assignor to Compagnie de Pont-A-Mousson, Nancy, France, a corporation of France Application May 15, 1956, Serial No. 584,961

Claims priority, application France May 16, 1955

12 Claims. (Cl. 74—754)

The present invention relates to an automatic control device for an epicyclic gear box of the type having epicyclic gear trains whose toothed elements are always in mesh, this gear box being driven by a driving shaft and provided with compressed-fluid actuating devices for selecting the gear trains according to the speeds required for the motor vehicle or other machine equipped with this gear box.

An object of the invention is to provide an improved automatic control device of the type comprising a pilot device controlled by a centrifugal governor mounted on the driving shaft, this pilot device controlling the movable member of a selector-distributor which connects the actuating devices of the gear box to a source of fluid under pressure.

Another object of the invention is to provide an automatic control device in which the pilot device is connected to the movable member of the selector by three servomotors acting unidirectionally, two of the servomotors having such travel that they cause said movable member of the selector to move stage by stage in opposite directions, each movement corresponding to one speed change, the third servomotor having such travel that it causes said movable member to move through at least two stages in the direction for changing down the speeds.

By means of this arrangement, the automatic control device changes down the speeds by stages through the medium of one of the first two servomotors or, if necessary, changes down the speeds very rapidly through the medium of the first servomotor, by a direct change down from the fourth or third speed to the first speed.

Another object of the invention is to provide various applications of the automatic control device and in particular a motor unit which comprises in combination with this control device: a motor whose output shaft is connected, preferably through the medium of a hydraulic coupling, to the input shaft of the gear box provided with the hydraulic actuating devices, and a pump providing hydraulic pressure, the governor being mounted on the output shaft of the motor and preferably so adapted as to provide from the pump pressure a pressure which varies with the speed of said motor shaft and is fed, through the pilot device, to the servomotor of the selector, the actuating devices of the gear box being fed with the pressure provided by the pump through the medium of the selector which forms a distributor.

Further features and advantages will be apparent from the ensuing description and accompanying drawings to which the invention is in no way limited.

Figure 9:
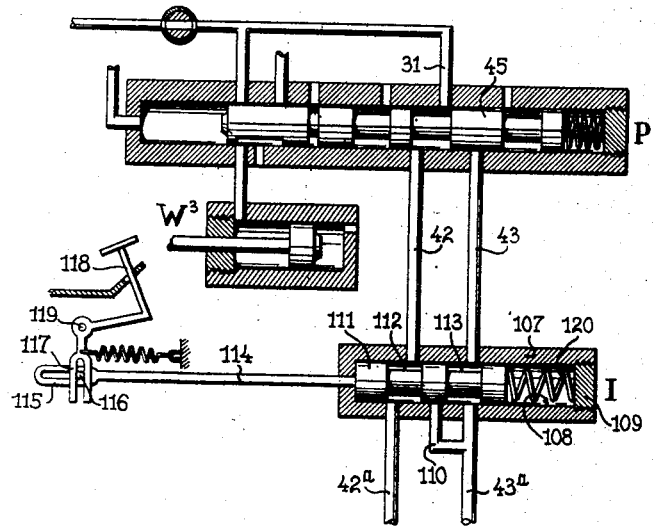
Figure 10:
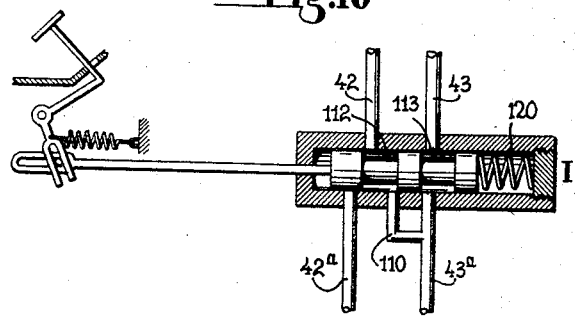

Figs. 5 to 8 are diagrammatic views of a modification of the pilot device respectively in positions corresponding to normal operation, changing down the speeds, changing up the speeds and changing down rapidly to the first speed, and Figs. 9 and 10 are diagrammatic views of an auxiliary device which may be arranged between the pilot device and the two servomotors ensuring the stage by stage movement of the selector and is adapted, in the event of racing of the motor, to permit only one speed change down, this auxiliary device being shown in Fig. 9 in its inoperative position (allowing normal operation of the unit) and in Fig. 10 in its operative position.

Figure 1:
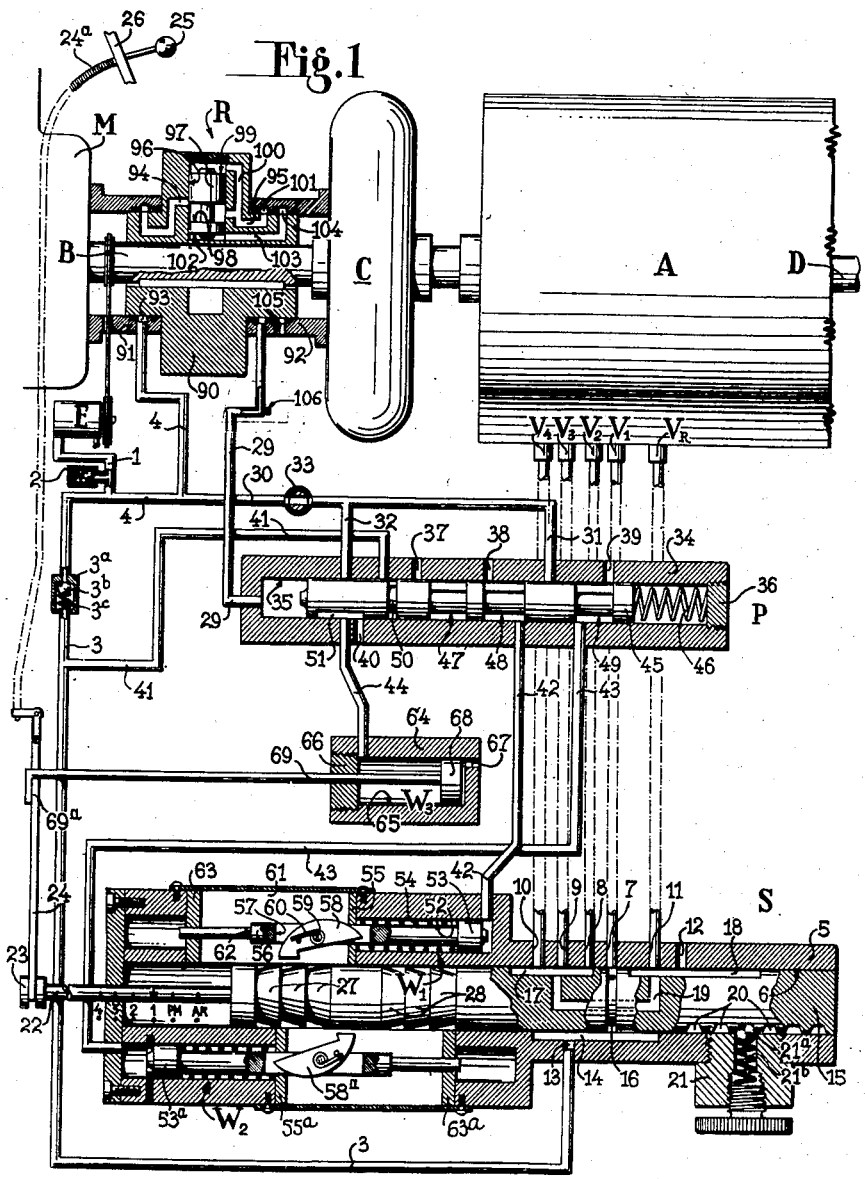
Fig. 1 is a diagrammatic view of transmission unit embodying the invention, with the first speed engaged.

In the embodiment shown in Figs. 1 to 4, the invention controls a gear box A (Fig. 1). The latter permits changing the transmission ratios between a driving shaft B corresponding to the output shaft of a motor M, the gear box being connected to this shaft B for example by a hydraulic coupling C, and a driven shaft D. These speed changes are effected in accordance with the speed of the driving shaft B with the aid of a centrifugal governor R mounted on the driving shaft B.

The gear box A is of the well-known epicyclic type. It permits, for example, obtaining four forward speeds and one reverse speed, each of these speeds being obtained by admitting oil under pressure into one of five actuating devices in the form of rams $V_1$, $V_2$, $V_3$, $V_4$, $V_R$, each of which actuates the gear engaging mechanism of one of these speeds.

The oil under pressure is supplied by a pump E driven by the driving shaft B. The delivery side of the pump E is connected to a pipe 1 to which is branch-connected a fluid discharge valve which opens at a line pressure $pm$, for example, around 18 kg. per sq. cm.

Branch-connected to the pipe 1 is, first, a pipe 3 leading to a speed selector S which distributes the oil under pressure to one of the above-mentioned rams $V_1$, $V_2$, $V_3$, $V_4$, $V_R$ and, secondly, a pipe 4 feeding the centrifugal regulator R, which in turn feeds oil to a pilot device P which automatically controls the selector S for changing from first speed to fourth speed and vice versa.

A check valve $3^a$ is disposed between the pipes 1 and 3, the ball $3^b$ thereof being held against its seating by a spring $3^c$. This valve is adapted to maintain in the pipes 1 and 4 a certain residual pressure which is less than $pm$ and is, for example, around 12 kg. per sq. cm., when the selector S, and in consequence the pipe 3, are connected to exhaust.

The selector S comprises an elongated body 5 provided longitudinally with a bore 6 and radially with, first, ports 7, 8, 9, 10, 11 and 12 which communicate with the bore 6 and are connected respectively to the rams $V_1$, $V_2$, $V_3$, $V_4$, $V_R$ and to exhaust, and, secondly, a port 13 connected to the pipe 3 and to a longitudinal recess 14 formed in the wall of the bore 6.

Slidable in the bore 6 is a slide 15 comprising an annular recess 16 which is capable of putting the port 13 in communication with the five ports 7, 8, 9, 10 and 11. This slide also comprises two recesses 17 and 18 which extend longitudinally of the slide in front of the ports 7 to 12 and are interconnected by a passageway 19 in the slide. The recess 17 has such length that it is capable of putting the four ports 7, 8, 9 and 10 in communication with one another and the recess 18 is capable of putting the ports 9 and 12 in communication with each other.

Further, the slide 15 comprises adjacent one of its ends six notches 20 pertaining to the six successive positions thereof corresponding to the six gear box conditions ranging from reverse speed to the fourth speed. These notches co-operate with a locking device 21 having a ball 21ª which may be urged into any one of these notches by the force exerted by a spring 21ᵇ.

For manual operation of the gear box, the other end of the slide 15 is connected to a rod 22 provided with a recess 23 in which is engaged a shifting fork 24 connected by a sheathed cable 24ª to a control push-pull knob 25 disposed on the instrument panel 26, or near the steering wheel if it concerns a motor vehicle.

Adjacent its end connected to the rod 22 the slide 15 is provided with two series 27 and 28 of saw-tooth recesses. The three recesses of the series 27 are arranged in the opposite direction to the recesses of the series 28. The series 27 and 28 correspond respectively to the three automatic speed changes from first speed to fourth speed and vice versa. These recesses are adapted to co-operate with two servomotors, described hereinunder, for the purpose of automatically shifting the slide 15.

The pipe 4 supplies oil under pressure to the governor R. The latter, of known type, comprises, for example, a body 90 keyed to the shaft B and rotating in two fixed distributor rings 91 and 92. The ring 91 is provided with an inner annular recess 93 with which the pipe 4 communicates. This recess communicates with an inlet passageway 94 formed in the body 90. This passageway communicates with an outlet passageway 95 by way of a radial bore 96. A slide 97 slides in this bore and is provided with an annular recess 98 which permits a variable closing of the end of the passageway 94. The space provided above the upper face 95 of the slide 97 communicates with the passageway 95 through a passageway 100. The passageways 95 and 100 communicate with an annular recess 101 in the ring 92 and this recess communicates with the pilot device P through a pipe 29.

In order to permit the slide 97 freely to return toward the axis of the shaft B when the rotational speed of the latter drops, the face 102 of the slide is in permanent communication with exhaust through a passageway 103, a recess 104 in the ring 92 and an aperture 105 formed in the latter. An escape jet 106 is inserted in the pipe 29.

The governor R controls the oil pressure in the pipe 29 in such manner that it varies with the speed of the driving shaft B, since for each speed the slide 97 takes up a position of equilibrium under the opposing effects of the centrifugal force and the pressure prevailing in the passageways 95 and 100, and in consequence the pressure on the upper face 99 of the slide 97.

Branching off the pipe 4 is a pipe 30 which does not communicate with the governor R but is directly connected to the pilot device P by two branch pipes 31 and 32. This pipe 30 may be closed by a cock 33 when it is desired to change from first speed to fourth speed and vice versa by means of the push-pull knob 25.

The pilot device P constitutes a slide distributor. It comprises a body 34 provided, longitudinally, with a blind bore 35 closed by a plug 36 and, radially, with ports 37, 38, 39 and 40 connected to exhaust and communicating with the bore 35. Also communicating with the latter and constituting inlets are the pipe 29 from the governor R, the branch pipes 31 and 32 from the pump E, and a pipe 41 connected below the check valve 3ª to the pipe 3 connected to the rams $V_1$, $V_2$, $V_3$, $V_4$, $V_R$ through the selector S. Communicating with the bore 35 and constituting outlets are three pipes 42, 43 and 44 connecting the pilot device P to the above-mentioned servomotor automatically shifting the slide 15 of the selector S for changing from first to fourth speed and vice versa.

Sliding in the bore 35 of the pilot device P is a slide 45 which is spring-loaded at one end by a spring 46 and subjected at its other end to the variable pressure of the oil delivered by the pipe 29 from the governor R and is in equilibrium between these two opposing actions. This slide is provided with three wide annular recesses 47, 48 and 49 and a narrow annular recess 50 capable of connecting the pipes 32 and 44. It is also provided adjacent its left end, as seen in Fig. 1, with a recess 51 capable of connecting the pipe 44 to the exhaust port 40.

As has been hereinabove mentioned, the pilot device P controls a device having three servomotors.

This device comprises, first, two operating rams $W^1$ and $W^2$ for the slide 15 of the selector S for automatically changing from first to fourth speed, one ram changing up and the other changing down, and, secondly, an operating ram $W^3$ for the slide 15 for effecting an automatic return from fourth or third speed to first speed, in the event of a sudden slowing down of the shaft B.

The ram $W^1$ for changing up the speeds comprises a blind bore 52 whose axis is parallel to that of the slide 15, the pipe 42 being connected to the closed end of this bore. A piston 53 slides in this bore in opposition to the action of a spring 54 which bears against an abutment 55. Piston 53 is provided with a rod 56 which extends through the abutment 55 and is provided with a slot 57. Mounted in the latter is a pawl 58 the nose of which is adapted to co-operate with the recesses 27 in the slide 15. The other end of the pawl 58 is capable of co-operating with the abutment 56. The pawl 58 is pivotably mounted on a pin 59 and is urged by a spring 60 in such manner that its nose tends to engage a recess 27. The pawl 58 is longitudinally movable through an opening 61 formed in the body 5 of the selector. The rod 56 terminates in a cylindrical portion of reduced diameter which forms a shoulder 62 capable of engaging a fixed abutment 63.

The piston 53 is capable of occupying two positions. When it is urged by the spring 54 to the right as seen in Fig. 1, the end of the pawl 58 is depressed by the abutment 55 and the nose thereof is held away from the slide 15. When oil under pressure is admitted through the pipe 42 the piston is urged to the left and in the course of its travel the end of the pawl disengages from the abutment 55 and the pawl nose, urged by the spring 60, engages with a recess 27 which is disposed in front of it. At the end of the travel to the left (Fig. 2), the shoulder 62 encounters the abutment 63 and the pawl 68 is still in engagement with the same recess of the slide 15, which has moved along with the piston 53.

The ram $W^2$ for changing down the speeds is identical to the ram $W^1$ and its essential elements are designated throughout figures by the same reference characters carrying the letter $a$.

The ram $W^3$ which ensures the automatic speed change from fourth or third speed to first speed comprises a body 64 having a blind bore 65 closed by a plug 66. Connected to one end of this bore, adjacent the plug, is the pipe 44 from the pilot device P. An exhaust aperture 67 is provided at the other end of the bore. Sliding in the bore 65 is a piston 68 whose travel or stroke corresponds to that of the slide 15 when moving from the position corresponding to the first speed to that corresponding to the fourth speed. A rod 69 connected to the piston 68 is connected to the shifting fork 24 of the slide 15 by unidirectional connection means 69ª so that when changing up the speeds the fork 24 shifts the piston 68 to the left as seen in Fig. 1, and when changing down the speeds, corresponding to a sudden slowing down, it is the piston 68 which shifts the slide 15 to the right. Moreover, when manually changing from first speed to neutral, moving the fork 24 to the right does not shift the piston 68, which is at the end of its stroke.

Figure 4:
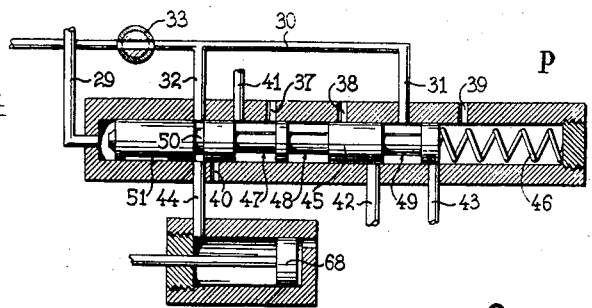
Fig. 4 is a diagrammatic view of the pilot device and the first-speed engaging ram in position for changing down to the first speed.

The above-described hydraulic control device operates in the following manner:

Assuming the vehicle to be stationary, the motor stopped and the slide 15 in its neutral position, no oil pressure prevails in the pipes, since the pump E does not operate. As soon as the motor is started up the pump E. delivers oil to the pipe 4 at a pressure of around 2 kg. per sq. cm. and the oil issues from the governor R through the pipe 29 at a pressure below 0.3 kg. per sq. cm. This pressure is insufficient to press the slide 45 of the pilot device P to the right as seen in Fig. 1. This slide 45 is in its extreme left position as shown in Fig. 4. The pipe 41 connected to the supply pipe 3 for the rams $V_1$, $V_2$, $V_3$, $V_4$ and $V_R$ is connected to exhaust. Changing from neutral to first speed is effected by shifting the slide 15 of the selector S one notch 20 to the left by means of the push-pull knob 25. Fig. 1 shows the position then assumed by this knob.

The motor is then accelerated by depressing the accelerator pedal or other accelerating means, the rotational speed of the shaft B increases and rapidly reaches a speed of, for example, about 1,500 R. P. M. corresponding to a pressure $p_2$ of around 1.5 kg. per sq. cm. This pressure admitted through the pipe 29 urges the slide 45 of the pilot device P to the position shown in Fig. 1 and thereby closes the pipe 41.

Oil pressure then increases in the pipes 3 and 4 and the ram $V_1$ until a pressure of around 15 kg. per sq. cm. is reached and the vehicle starts to move. The pipes 42 and 43 are connected to exhaust through the ports 38 and 39 respectively.

The manner of changing up and changing down the speeds will now be described.

Changing up the speeds

Changing from first to second speed is effected automatically when the driving shaft B increases its rotational speed, owing to acceleration of the motor, and exceeds, for example, 3,000 R. P. M. which corresponds to an oil pressure $p^3$, for example around 5 kg. per sq. cm. The slide 45 of the pilot device P is then urged to the right to the position shown in Fig. 2 under the effect of this pressure $p^3$ and the pipe 31 is put into communication with the pipe 42. The latter conducts the oil under pressure to one side of the piston 53 of the ram $W^1$. This piston is urged to the left, as seen in Fig. 1, the end of the pawl 58 is disengaged from the abutment 55 as explained above and, under the effect of the spring 60, the nose of the pawl engages the first recess 27 of the slide 15 of the selector S when the piston 53 has travelled half way through its stroke. Thenceforth the piston 53 continues its movement and shifts the slide 15 to the left until the shoulder 62 encounters the abutment 63. The slide 15 is thus shifted to the extent of one notch 20 and the second speed is engaged whereby the load is increased. As the position of the accelerator pedal remains unchanged the driving shaft B decreases speed and the pressure exerted on the slide 45 of the pilot device P falls below the pressure $p^3$ and the spring 46 urges the slide 45 to the position shown in Fig. 1 in which the pipe 31 is closed and the pipe 42 connected to exhaust. Thus under the effect of the spring 54 the piston 53 of the ram $W^1$ moves to the right, as seen in Fig. 1, and the pawl 58 also moves without shifting the slide 15 but disengages from the series of recesses 27 when its end once more engages the abutment 55.

Changing up to third and fourth speeds is effected in the same manner each time the speed of the motor reaches the value corresponding to the set pressure $p^3$.

It should be noted that when the slide 15 is in its position corresponding to fourth speed, the pawl 58 has such position relative to the slide that if the rotational speed of the shaft B exceeds, for example, 3,000 R. P. M. and in consequence the piston 53 tends to be urged to the left as explained above, at the end of the travel of the piston 53 the nose of the pawl 58 merely engages the third recess 27 and is incapable of shifting the slide 15 to the left. Thus any accidental displacement of the slide 15 beyond its top speed position is prevented, which constitutes a safety feature.

Changing down the speeds

When slowing down, the speed of the shaft B gradually decreases and the pressure in the pipe 29 is capable of dropping to value $p^1$. The slide 45 then moves to the left and returns to the position shown in Fig. 3. Oil under pressure in the pipe 31 is then admitted into the pipe 43 and is conducted to the piston $53^a$ of the ram pipe $W^2$. The same procedure as that related above for changing up the speeds occurs but in the opposite direction the load decreasing at each downshifting and the position of the accelerator pedal remaining unchanged, and the pawl $58^a$, in co-operating with a recess 28, shifts the slide 15 of the selector S one notch 20 to the right, as seen in Fig. 1.

The next lowest speed is then engaged and the shaft B rotates at a higher speed, the oil pressure increases in the pipe 29 and the slide 45 of the pilot device P is urged to the right to the position shown in Fig. 1. This causes the pawl $58^a$ to return to its initial position.

It should be noted that when the first speed is engaged (Fig. 1), the pawl $58^a$ has such position relative to the slide 15 that if the speed of the shaft B drops and if in consequence the piston $53^a$ tends to be urged to the right as explained above, at the end of the travel of the piston $53^a$ the nose of the pawl $58^a$ merely engages the third recess 28 and is incapable of shifting the slide 15 to the right. Thus any automatic changing from first speed to neutral and to reverse speed is impossible, which constitutes a safety feature.

The foregoing description relates to a progressive changing down of the speeds. However, in the event of a sudden slowing down, for example due to a sudden release of the accelerator pedal or braking for stopping the vehicle, it is possible to change down directly from fourth or third speed to first speed in the manner now to be described.

In the event of suddenly braking, the speed of the shaft B suddenly decreases. The oil pressure in the pipe 29 rapidly falls below the value $p^1$ and, as a consequence of this sudden pressure drop, the slide 45 is urged to its extreme left position shown in Fig. 4. Thus the pipes 32 and 44 are interconnected by the recess 50 and the pipe 41 is connected to exhaust, the pressure being admitted on the left side of the piston 68 in the ram $W^3$. This piston 68 is then moved to the right and shifts the fork 24 of the slide 15. The stroke of the piston 68 is so arranged that it reaches the end of its travel when the slide 15 is in its position corresponding to the first speed.

As the pipe 41 is connected to exhaust the pressure drops in the pipe 3 and this causes an automatic disengagement of the gear box and avoids stalling the motor.

When the shaft B resumes its normal running speed the slide 45 of the pilot device P returns to the second position and the vehicle once more moves off in the above-described manner.

By means of this device the successive engagement within a very short period of time of each of all the speeds from the fourth or third speed to the first speed is avoided, which constitutes an appreciable advantage from the point of view of the time required for changing down from fourth to first speed.

It should be noted that the cock 33 inserted in the pipe 30 above the pipes 31 and 32 relative to the oil flow permits operating the gear box A with the manual control 25. It is merely necessary to close this cock so that the rams $W^1$, $W^2$, $W^3$ are no longer fed with oil under pressure and the automatic control is rendered inoperative. The manual control could be used for changing down the speeds even if the motor races, for example when running down hill and if the mechanism does not include the auxiliary device shown in Figs. 9 and 10 and described hereinunder.

Figs. 5 to 8 show a modification $p^1$ of the pilot device divided into two parts.

This device $p^1$ comprises a body 71 provided with two parallel blind bores 35$^a$ and 72. The bore 35$^a$ is closed by a plug 36 and the bore 72 by a plug 73. The body 71 is also provided with apertures 74 (connected to the pipe 29), 37 and 40, and pipes 30, 41 and 44, all communicating with the bore 72, an aperture 31 connecting the bores 35$^a$ and 72, and apertures 75 (connected to the pipe 29), 38 and 39 and pipes 42 and 43 all communicating with the bore 35$^a$.

Sliding in the bore 72 is a slide 76 provided with two annular recesses 77 and 78 and a longitudinal recess 51$^a$ which respectively put into communication the pipe 30 and the aperture 31, the pipes 30 and 44, and the aperture 40 and the pipe 44. The slide 76 is urged to the left, as seen in Fig. 5, by a spring 79. Sliding in the bore 35$^a$ is a slide 80 provided with two annular recesses 48 and 49, the recess 48 being adapted to connect the aperture 31 to the pipe 42 or the aperture 38 to the pipe 42, and the recess 49 connecting the aperture 31 to the pipe 43 or the aperture 39 to the pipe 43.

For a pressure equal to at least $p^1$ (Fig. 6), the slides 76 and 80 are urged to the left but not to the full extent of their travel. The pipes 41 and 44 are closed. The pipe 30 communicates with the aperture 31 which communicates with the pipe 43 and the piston 53$^a$ is thus subjected to pressure. All the other pipes are closed. This position corresponds to changing down the speeds.

For a pressure equal to at least $p^2$ (Fig. 5), the springs 46 and 79 are further compressed. The pipe 30, the aperture 31, the pipes 41 and 44 are closed, and the pipes 42 and 43 are connected to exhaust by way of the apertures 38 and 39. This position corresponds to normal running of the motor.

For a pressure equal to at least $p^3$ (Fig. 7), the slides 76 and 80 are urged still more to the right. The pipe 30, the aperture 31 and the pipe 42 communicate with one another. The pipe 41 is connected to exhaust and the pipe 43 closed. This position corresponds to changing up the speeds.

When the pressure drops below $p^1$, the slides 76 and 80 are urged to their extreme left position as shown in Fig. 8. The pipes 30 and 44 communicate with one another and the pipe 41 is connected to exhaust, the pipes 42 and 43 being closed. This position corresponds to a rapid change to first speed.

The slide 76 is more particularly that which connects the rams $V_1$, $V_2$, $V_3$, $V_4$ and $V_R$ of the gear box to exhaust and thus permits a rapid change to first speed.

The slide 80 is that which pertains to an automatic changing up or down of the speeds.

The device $p^1$ operates in a similar manner to the device P and its operation therefore need not be described.

Figs. 9 and 10 are partial views of a modification comprising an auxiliary device I inserted in the pipes 42 and 43 feeding the rams $W^1$ and $W^2$ pertaining to changing up and changing down the speeds respectively. This device is adapted to permit changing down the speeds even when the motor races, as for example when the vehicle is travelling down hill.

The device comprises a cylinder 107 provided with a longitudinal blind bore 108 closed by a plug 109. Communicating with the bore 108 are pipes 42 and 43 and pipes 42$^a$ and 43$^a$ respectively connected to the rams $W^1$ and $W^2$, and a pipe 110 conected to the pipe 43$^a$.

Sliding in the bore 108 is a slide 111 provided with two annular recesses 112 and 113. At one end, the slide is provided with an operating rod 114 terminating in an elongated slot 115.

A slide 116 is disposed in this slot and is capable of being moved by a fork 117 connected to the accelerator pedal 118 of the vehicle pivotably mounted at 119. The length of the elongated slot 115 is so arranged that when the accelerator pedal exceeds its normal travel for decelerating, the slide 116 shifts the rod 114 and thus shifts the slide 111 in opposition to the action of the spring 120 compressed between the plug 109 and the other end of the slide.

Thus the slide 111 is capable of occupying two positions. When it is urged to the extreme left position by the action of the spring 120 (Fig. 9), the pipes 42 and 42$^a$ on one hand and pipes 43 and 43$^a$ on the other communicate with each other by way of the recesses 112 and 113 and the pipe 110 is closed.

This position corresponds to normal running of the motor in which the supply circuits for the rams $W^1$ and $W^2$ are not reversed.

When the slide 111 is moved to the right and is caused to occupy the position shown in Fig. 10, the spring 120 being compressed upon releasing the accelerator pedal 118, the pipes 42 and 43 communicate with the pipe 43$^a$ by way of the recess 112 and the pipe 110 and the recess 113. The pipe 42$^a$ is closed.

Figure 2:
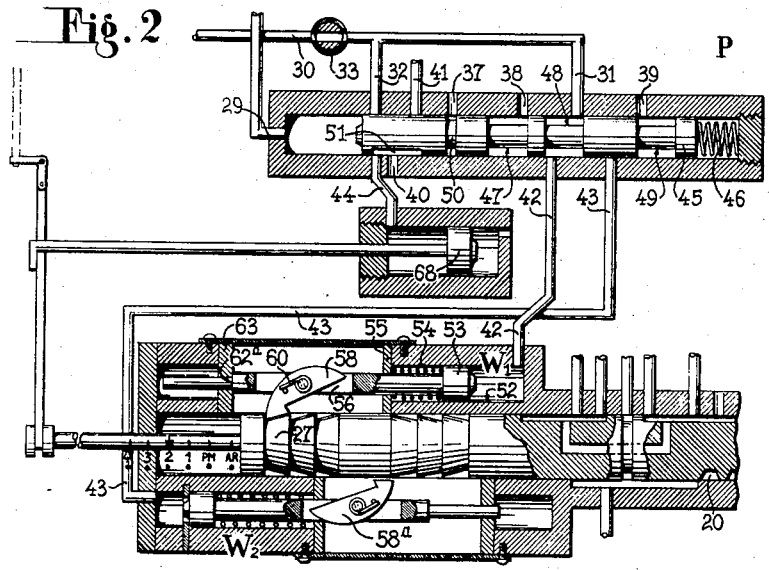
Fig. 2 is a diagrammatic view of the device embodying invention after the second speed has been engaged.
Figure 3:
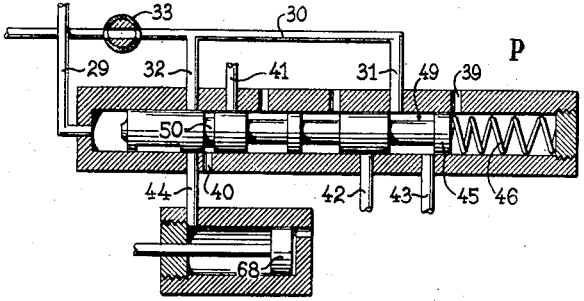
Fig. 3 is a diagrammatic view of the pilot device in condition for changing down the speeds.

Thus, irrespective of the displacement of the slide 45 of the pilot device P in the positions shown in Figs. 2 or 3, oil under pressure from the pipe 31 is always conducted to the ram $W^2$ pertaining to changing down the speeds.

This is of particular interest when the vehicle descends a very steep slope and thus causes the motor to run at a speed which may exceed the maximum speed at which changing up the speeds should normally be effected; for instead of changing up the speeds the speeds are changed down, which permits advantage to be gained from the braking action of the motor. This constitutes an additional safety feature.

Although specific embodiments of the invention have been hereinabove described, many modifications and changes may be made therein without departing from the scope of the invention as defined in the appended claims.

Thus the selector could be a device having a rotating member instead of a slide, the rams or servomotors $W^1$, $W^2$ and $W^3$ being in this case adapted to shift a rod provided with a rack which drives said rotating member of the selector by way of a toothed wheel provided on the member for this purpose.

Having now described my invention what I claim as new and desire to secure by Letters Patent is:

1. In a control device using fluid under pressure for controlling a gear box, in combination: a selector acting as a distribtuor for distributing said fluid to the gear box, this selector being provided with a movable distributor member; three single-acting servomotors for moving said movable member of the selector; and a pilot device for controlling the operation of said servomotors, two of these servomotors having such travel that they move said movable member in opposite directions by stages, each stage of movement corresponding to changing from one speed to the next of the gear box, and the third servomotor having such travel that it moves the movable member through at least two stages in one go in a direction for changing down the speeds.

2. In a control device for a gear box provided with actuating devices controlled by fluid under pressure, in combination: a driving shaft connected to the gear box; a source of fluid under pressure for feeding the actuating devices; a centrifugal governor mounted on the driving shaft; a selector acting as a distributor for connecting the actuating devices of the gear box to the source of fluid under pressure, this selector comprising a movable distributor member; three single-acting servomotors for moving said movable member of the selector; and a pilot device controlled by the governor for controlling said servomotors; two of these servomotors having such travel that they cause the movable member to be moved in opposite directions by stages, each stage of movement corresponding to changing from one speed to the next of the gear box, and the third servomotor having such travel that it moves the movable member through at least two stages in one go in a direction for changing down the speeds.

3. A speed changing device comprising in combination with a driving shaft: a gear box connected to the latter and provided with actuating devices controlled by fluid under pressure; a source of fluid under pressure for feeding the actuating devices; a centrifugal governor mounted on the driving shaft; a selector acting as a distributor for connecting the actuating devices of the gear box to the source of fluid under pressure, this selector comprising a movable distributor member; three single-acting servomotors for moving said movable member of the selector; and a pilot device controlled by the governor for controlling said servo-motors; two of these servomotors having such travel that they cause the movable member to be moved in opposite directions by stages, each stage of movement corresponding to changing from one speed to the next of the gear box, and the third servomotor having such travel that it moves the movable member through at least two stages in one go in a direction for changing down the speeds.

4. A motor transmission unit comprising in combination: an internal combustion motor having an output shaft; a gear box connected to the latter and provided with actuating devices; a pump driven by said shaft and forming a source of fluid under pressure; a centrifugal governor mounted on said shaft; a selector acting as a distributor for connecting said actuating devices to the pump, said selector comprising a movable distributor member; three single-acting servomotors for moving said movable member of the selector; and a pilot device controlled by the governor for controlling said servo-motors; two of these servomotors having such travel that they cause the movable member to be moved in opposite directions by stages, each stage of movement corresponding to changing from one speed to the next of the gear box, and the third servomotor having such travel that it moves the movable member through at least two stages in one go in a direction for changing down the speeds.

5. In a control device using fluid under pressure for controlling a gear box, in combination: a selector acting as a distributor for distributing said fluid to the gear box, this selector being provided with a movable distributor member; a pilot device; and, for the purpose of moving said movable member of the selector, a first, a second and a third single-acting servomotor consisting of hydraulic rams having cylinders and pistons to which the supply of fluid under pressure is controlled by the pilot device, the rams of the first and second servomotors each being connected to the movable member of the selector by a device which comprises: a piston rod connected to the piston of the ram, a pawl mounted on the rod, a spring mounted on the rod for urging the pawl into an operative position; two fixed abutments one of which is adapted to stop further movement of the pawl after a given operative travel and the other being adapted to withdraw the pawl into an inoperative position after an inoperative return travel, and, disposed on the movable member of the selector, a series of recesses in each of which the pawl is engaged in its operative position, the recesses and the positions of the pawls relative to the two rams being arranged in opposite directions and the abutments being so disposed that the rams move the movable member of the selector stage by stage in opposite directions, each stage of movement corresponding to changing from one speed to the next, and the third servomotor being adapted to move the movable member of the selector through at least two stages in one go in a direction for changing down the speeds.

6. The structure as claimed in claim 5, wherein there is provided a manual control means for controlling the movable member of the selector and the ram of the third servomotor, which connects the pilot device to the movable member of the selector for the purpose of moving the movable member through at least two stages in one go in the direction for changing down the speeds, comprises, connected to its piston, a piston rod itself connected by a unidirectional connection means to said manual control means so that supply of fluid under pressure to said ram controlled by the pilot device brings the movable member of the selector back to the position corresponding to first speed, the movements of the movable member toward the positions corresponding to the higher gear box speeds bringing the piston of the ram constituting the third servomotor back to its inoperative position, said ram being then connected to exhaust through the medium of the pilot device.

7. A speed changing device comprising in combination with a driving shaft: a gear box connected to the latter and provided with actuating devices; a source of fluid under pressure for feeding the actuating devices; a centrifugal governor mounted on the driving shaft; a pilot device controlled by the governor; a selector acting as a distributor for connecting the actuating devices of the gear box to the source of fluid under pressure, this selector comprising a movable distributor member; and, for the purpose of moving said movable member of the selector, a first, a second and a third single-acting servomotor consisting of hydraulic rams having cylinders and pistons to which the supply of fluid under pressure is controlled by the pilot device, the rams of the first and second servomotors each being connected to the movable member of the selector by a device which comprises: a piston rod connected to the piston of the ram, a pawl mounted on the rod; a spring mounted on the rod for urging the pawl into an operative position; two fixed abutments one of which is adapted to stop further movement of the pawl after a given operative travel and the other being adapted to withdraw the pawl into an inoperative position after an inoperative return travel, and, disposed on the movable member of the selector, a series of recesses in each of which the pawl is engaged in its operative position, the recesses and the positions of the pawls relative to the two rams being arranged in opposite directions and the abutments being so disposed that the rams move the movable member of the selector stage by stage in opposite directions, each stage of movement corresponding to changing from one speed to the next, and the third servomotor being adapted to move the movable member of the selector through at least two stages in one go in a direction for changing down the speeds.

8. The structure as claimed in claim 7, wherein there is provided a manual control means for controlling the movable member of the selector and the ram of the third servomotor, which connects the pilot device to the movable member of the selector for the purpose of moving the movable member thrdough at least two stages in one go in the direction for changing down the speeds, comprises, connected to its piston, a piston rod itself connected by a unidirectional connection means to said manual control means so that supply of fluid under pressure to said ram controlled by the pilot device brings the movable member of the selector back to the position corresponding to first speed, the movements of the movable member toward the positions corresponding to the higher gear box speeds bringing the piston of the ram constituting the third servomotor back to its inoperative position, said ram being then connected to exhaust through the medium of the pilot device.

9. A speed changing device comprising in combination with a driving shaft: a gear box connected to the latter and provided with actuating devices controlled by fluid under pressure; a source of fluiid under pressure for feeding the actuating devices; a centrifugal governor driven by said shaft; a pilot device also subjected to the action of a fluid controlled by the governor so that said pressure acts on the pilot device in accordance with the rotational speed of said driving shaft; a selector acting as a distributor for connecting the actuating devices of the gear box to the source of fluid under pressure, said selector comprising a movable distributor member; and three single-acting servomotors controlled by said pilot device for moving the movable member of the selector in response to said pressure; two of these servomotors having such travel that they cause the movable member to be moved in opposite directions by stages, each stage of movement corresponding to changing from one speed to the next of the gear box, and the third servomotor having such travel that it moves the movable member through at least two stages in one go in a direction for changing down the speeds.

10. A speed changing device as claimed in claim 9, wherein the pilot device comprises a fixed body one end of which is subjected to the pressure of the fluid controlled by the governor, at least one slide movable in the body and, provided between this slide and the other end of the body, a spring, whereby this slide is in equilibrium between the opposing actions of the pressure of the fluid controlled by the governor and said spring.

11. A speed changing device as claimed in claim 10, wherein the fluid acting on the slide of the pilot device is the same fluid as that supplied by said source, said body of the pilot device being connected to said source through the governor and branch-connected relative to the selector.

12. A motor-transmission unit comprising in combination: an internal combustion motor having an output shaft; accelerating means for accelerating the motor; a gear box connected to the latter and provided with actuating devices; a pump driven by said shaft and forming a source of fluid under pressure; a centrifugal governor mounted on said shaft; a pilot device controlled by the governor; a selector acting as a distributor for connecting said actuating devices to the pump, said selector comprising a movable distributor member; and three single-acting servomotors controlled by said pilot device for moving said movable member of the selector; two of these servomotors having such travel that they cause the movable member to be moved in opposite directions by stages, each stage of movement corresponding to changing from one speed to the next of the gear box, and the third servomotor having such travel that it moves the movable member through at least two stages in one go in a direction for changing down the speeds, the first and second servomotors being of the type having a ram and each being connected to said source through the pilot device and through a supply pipe leading to the pilot device; and an auxiliary device connected to said accelerating means and interposed between the pilot device and the two servomotors which move the selector by stages, whereby in the absence of any acceleration of the motor by the accelerating means this auxiliary device connects to the servomotor which acts in the direction for changing down the speeds the supply pipe which in normal operation connects the pilot device to the ram of the servomotor for changing up the speeds so that in the case of racing of the non-accelerated motor any increase in the speed of the motor automatically results in a decrease in the speed transmitted by the gear box.

References Cited in the file of this patent

UNITED STATES PATENTS

| | | |
|---|---|---|
| 2,008,231 | Vincent | July 16, 1935 |
| 2,658,408 | Miller | Nov. 10, 1953 |